(12) United States Patent
Hung et al.

(10) Patent No.: US 12,061,494 B2
(45) Date of Patent: Aug. 13, 2024

(54) ELECTRONIC DEVICE WITH DISPLAY MODULE CAPABLE OF PRODUCING SOUND

(71) Applicant: Chiun Mai Communication Systems, Inc., New Taipei (TW)

(72) Inventors: Ching-Ming Hung, New Taipei (TW); Sheng-Hsiung Tsai, New Taipei (TW); Pei-Shuang Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 888 days.

(21) Appl. No.: 17/108,144

(22) Filed: Dec. 1, 2020

(65) Prior Publication Data

US 2021/0173432 A1  Jun. 10, 2021

(30) Foreign Application Priority Data

Dec. 4, 2019 (CN) .......................... 201911230023.0

(51) Int. Cl.
    *G06F 1/16* (2006.01)
    *G06F 1/18* (2006.01)
    *G10K 9/13* (2006.01)
    *H04R 9/02* (2006.01)

(52) U.S. Cl.
    CPC ............ *G06F 1/1605* (2013.01); *G06F 1/181* (2013.01); *G10K 9/13* (2013.01); *H04R 9/025* (2013.01)

(58) Field of Classification Search
    None
    See application file for complete search history.

(56) References Cited

U.S. PATENT DOCUMENTS

| 4,050,066 A * | 9/1977 | Yanagisawa | G10K 9/13 340/388.1 |
| 7,764,803 B2 * | 7/2010 | Kang | H04R 7/04 381/388 |
| 10,216,231 B1 * | 2/2019 | Landick | G06F 1/1656 |
| 2012/0243719 A1 * | 9/2012 | Franklin | H04R 1/02 381/333 |
| 2017/0318392 A1 * | 11/2017 | Kajanus | H04R 9/025 |
| 2022/0006478 A1 * | 1/2022 | Yu | H04R 7/045 |

FOREIGN PATENT DOCUMENTS

| CN | 108881523 A | 11/2018 |
| CN | 109905827 A | 6/2019 |
| CN | 110049412 A | 7/2019 |
| CN | 209057357 U | 7/2019 |
| TW | 201408087 A | 2/2014 |

* cited by examiner

Primary Examiner — Bernard Rojas
(74) Attorney, Agent, or Firm — ScienBiziP, P.C.

(57) ABSTRACT

A display module includes a middle frame, a display screen, a coil, and a magnet. The display screen is arranged on the middle frame. The display screen and the middle frame cooperatively define a receiving space. The coil defines an accommodation space. A portion of the magnet is accommodated in the accommodation space. The magnet and the coil are received in the receiving space. One of the magnet and the coil is arranged on the display screen, and the other one of the magnet and the coil is arranged on the middle frame.

5 Claims, 14 Drawing Sheets

US 12,061,494 B2

ELECTRONIC DEVICE WITH DISPLAY MODULE CAPABLE OF PRODUCING SOUND

FIELD

The subject matter herein generally relates to display modules, and more particularly to a display module for an electronic device.

BACKGROUND

Generally, full-screen display screens of electronic devices use piezoelectric materials or linear vibration motors to cause the screen to produce sound. However, due to poor practicability, high price of piezoelectric materials, and the need for additional IC amplifiers, the cost of the electronic device product is high, and the use of linear vibration motors occupies much internal space of the electronic device, which is not conducive to miniaturization of the electronic device.

BRIEF DESCRIPTION OF THE DRAWINGS

Implementations of the present disclosure will now be described, by way of embodiments, with reference to the attached figures.

DETAILED DESCRIPTION

Figure 1:
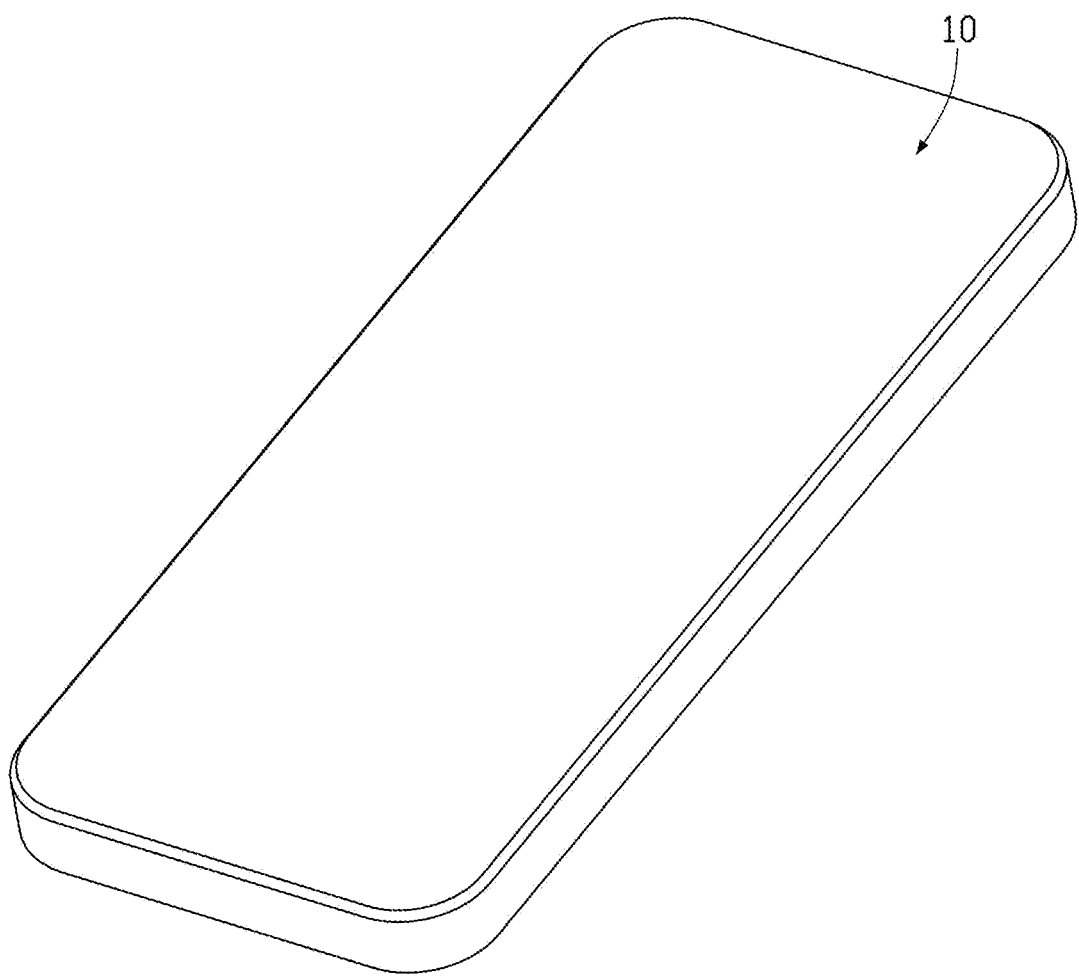
FIG. 1 is a schematic structural diagram of an electronic device according to an embodiment of the application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 shows an embodiment of an electronic device 100. In one embodiment, the electronic device 100 is a mobile phone. In other embodiments, the electronic device 100 may be a wearable device, a tablet computer, or the like.

Figure 2:
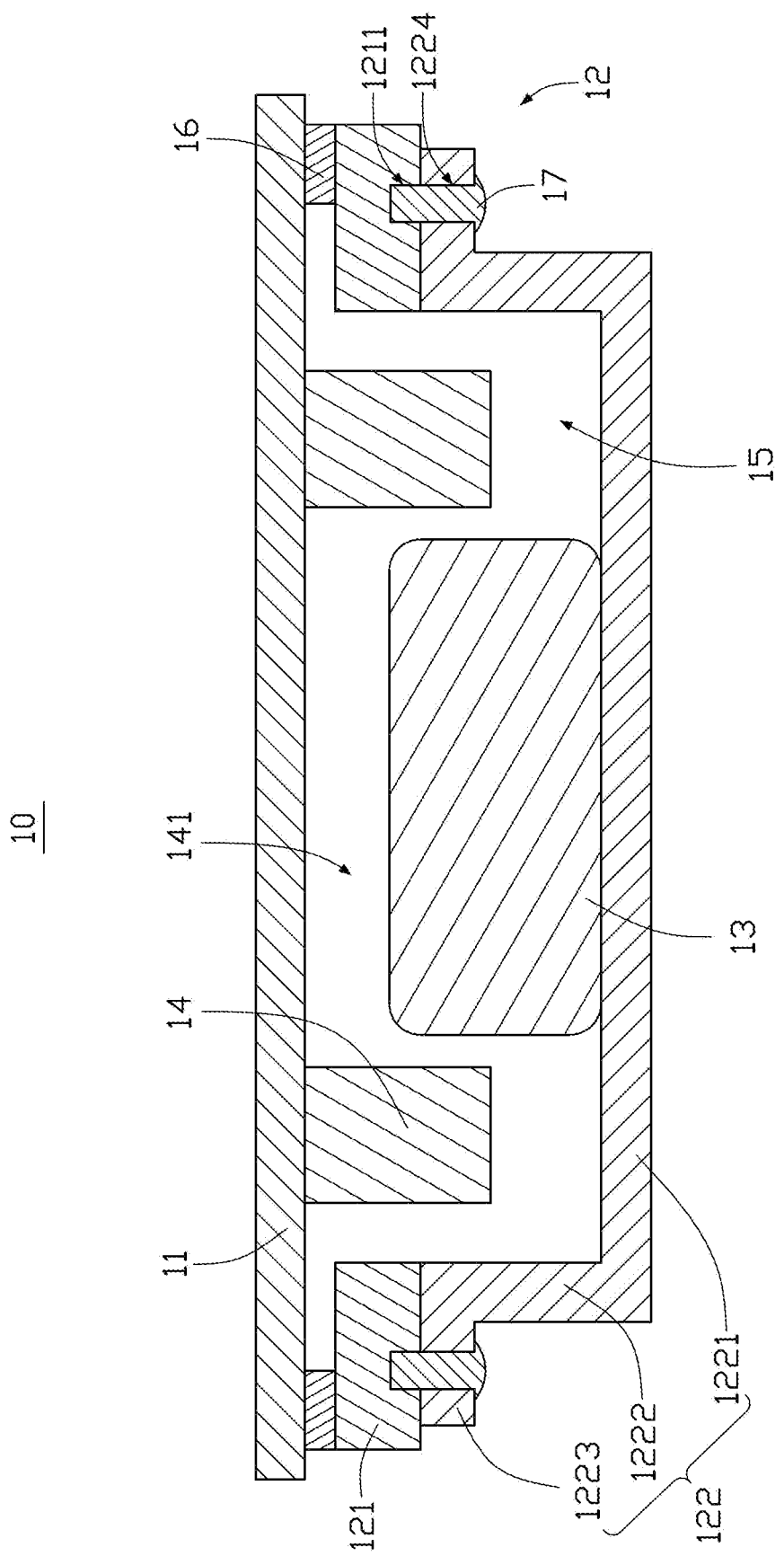
FIG. 2 is a schematic cross-sectional diagram of a display module according to an embodiment of the application.

Referring to FIGS. 1 and 2, the electronic device 100 includes a display module 10. The display module 10 includes a display screen 11, a middle frame 12, a magnet 13, and a coil 14. The display screen 11 is arranged on the middle frame 12 and cooperatively defines a receiving space 15 with the middle frame 12. The magnet 13 and the coil 14 are received in the receiving space 15.

In one embodiment, the middle frame 12 includes a first housing 121 and a second housing 122. The first housing 121 is arranged between the second housing 122 and the display screen 11 to couple the display screen 11 and the second housing 122 together. Specifically, the first housing 121 has an annular shape. The second housing 122 includes a bottom wall 1221, a side wall 1222 surrounding a periphery of the bottom wall 1221, and a connecting portion 1223. The connecting portion 1223 extends outward from one end of the side wall 1222 away from the bottom wall 1221. The first housing 121 is arranged on the connecting portion 1223. The second housing 122 may be an integrally formed structure. In another embodiment, the second housing 122 only includes the bottom wall 1221 and the side wall 1222, so that the first housing 121 is arranged at an end of the side wall 1222 away from the bottom wall 1221.

In other embodiments, the middle frame 12 may only include the second housing 122, so that the display screen 11 is directly arranged on the second housing 122.

Figure 3:
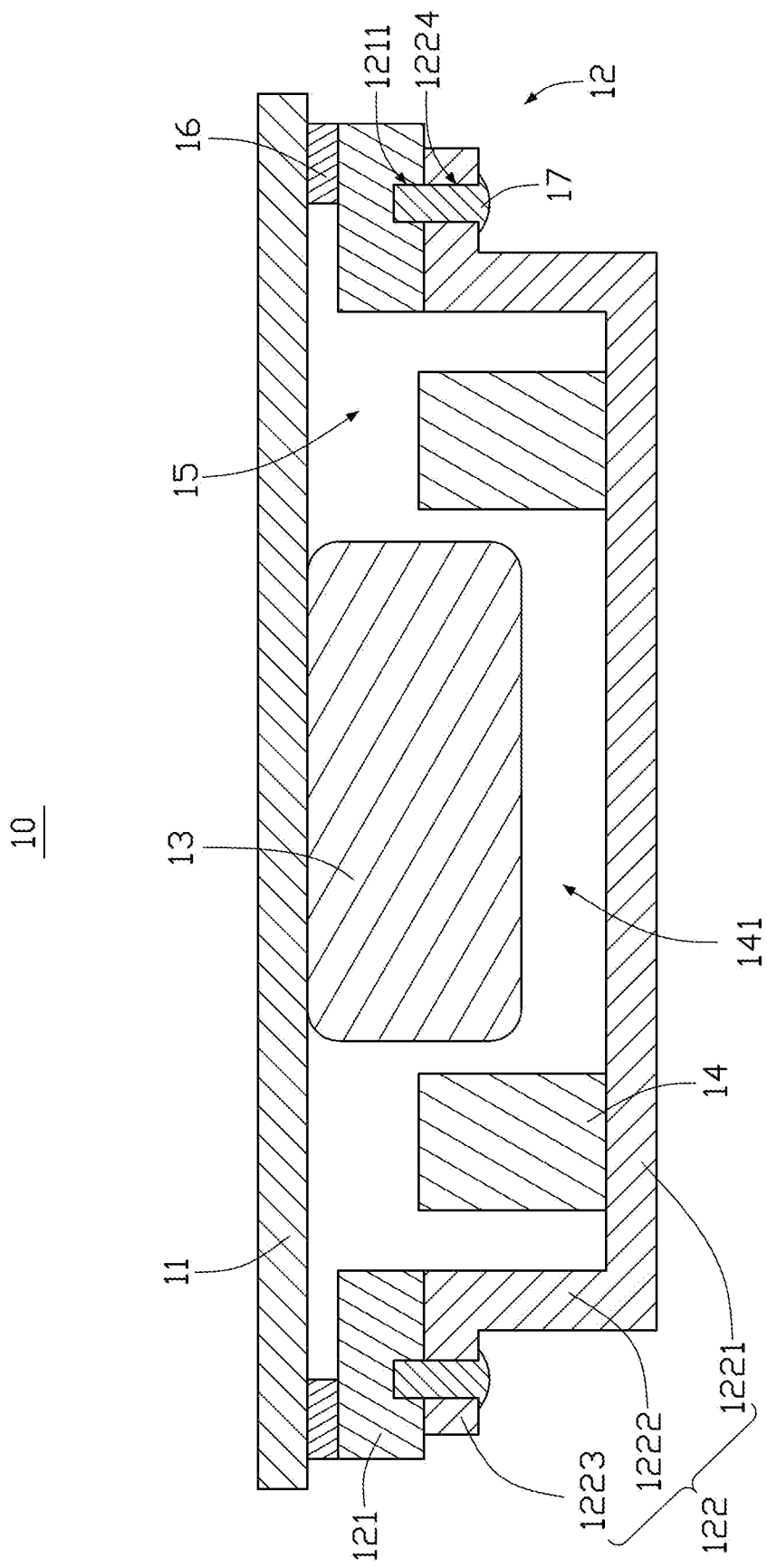
FIG. 3 is a schematic cross-sectional diagram of a display module according to another embodiment of the application.

Referring to FIGS. 2 and 3, one of the magnet 13 and the coil 14 is arranged on the display screen 11, and the other one of the magnet 13 and the coil 14 is arranged on the middle frame 12.

Figure 4:
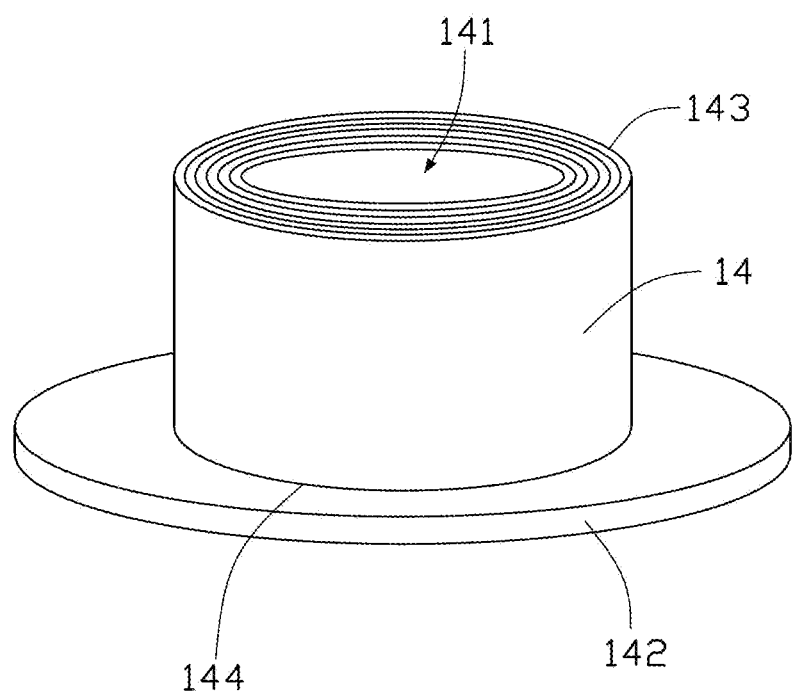
FIG. 4 is a schematic diagram of a coil according to an embodiment of the application.
Figure 5:
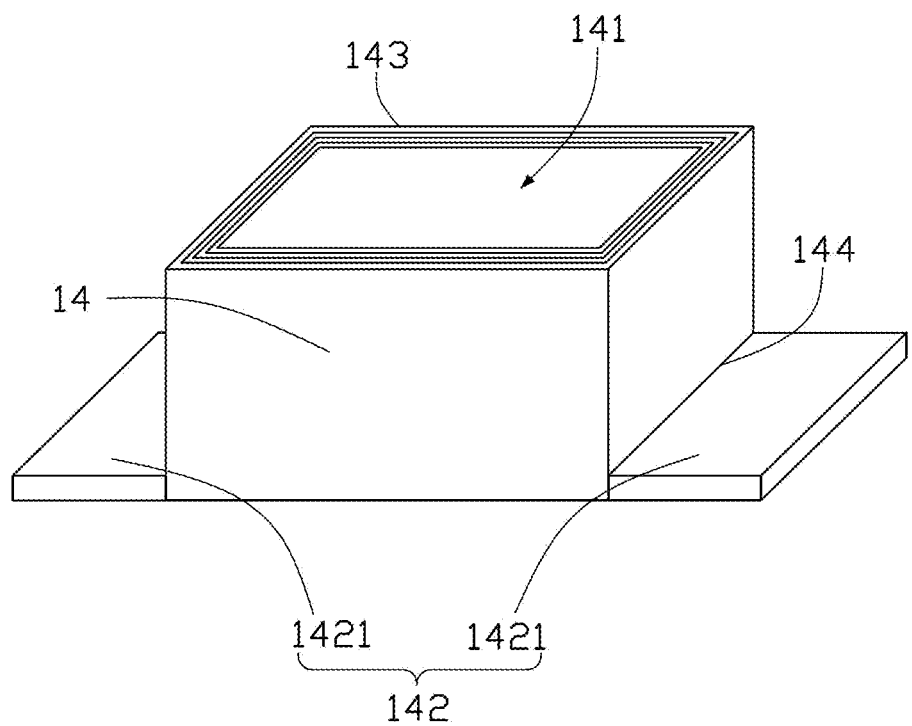
FIG. 5 is a schematic diagram of a coil according to another embodiment of the application.

Referring to FIGS. 4 and 5, in one embodiment, the coil 14 is an annular structure formed by winding a wire in one direction, thereby defining an accommodation space 141. A portion of the magnet 13 is accommodated in the accommodation space 141. A cross-sectional shape of the coil 14 may be a regular ring, an elliptical ring, a rectangular ring, or other irregular ringed shape. The magnet 13 may have a regular structure such as a rectangular parallelepiped structure, a cube structure, a cylindrical structure, or other irregular structure.

A fixing portion 142 is provided on the coil 14. The fixing portion 142 is used for installing the coil 14 onto the display screen 11 or the middle frame 12. In other embodiments, the fixing portion 142 may be omitted, so that the coil 14 is directly arranged on the display screen 11 or the middle frame 12.

Specifically, the coil 14 includes an upper edge 143 and a lower edge 144 facing away from the upper edge 143. The upper edge 143 faces the display screen 11. The fixing portion 142 extends from the lower edge 144 away from a central axis of the coil 14, and the coil 14 is arranged on the middle frame 12 through the fixing portion 142 (shown in FIG. 9).

Figure 6:
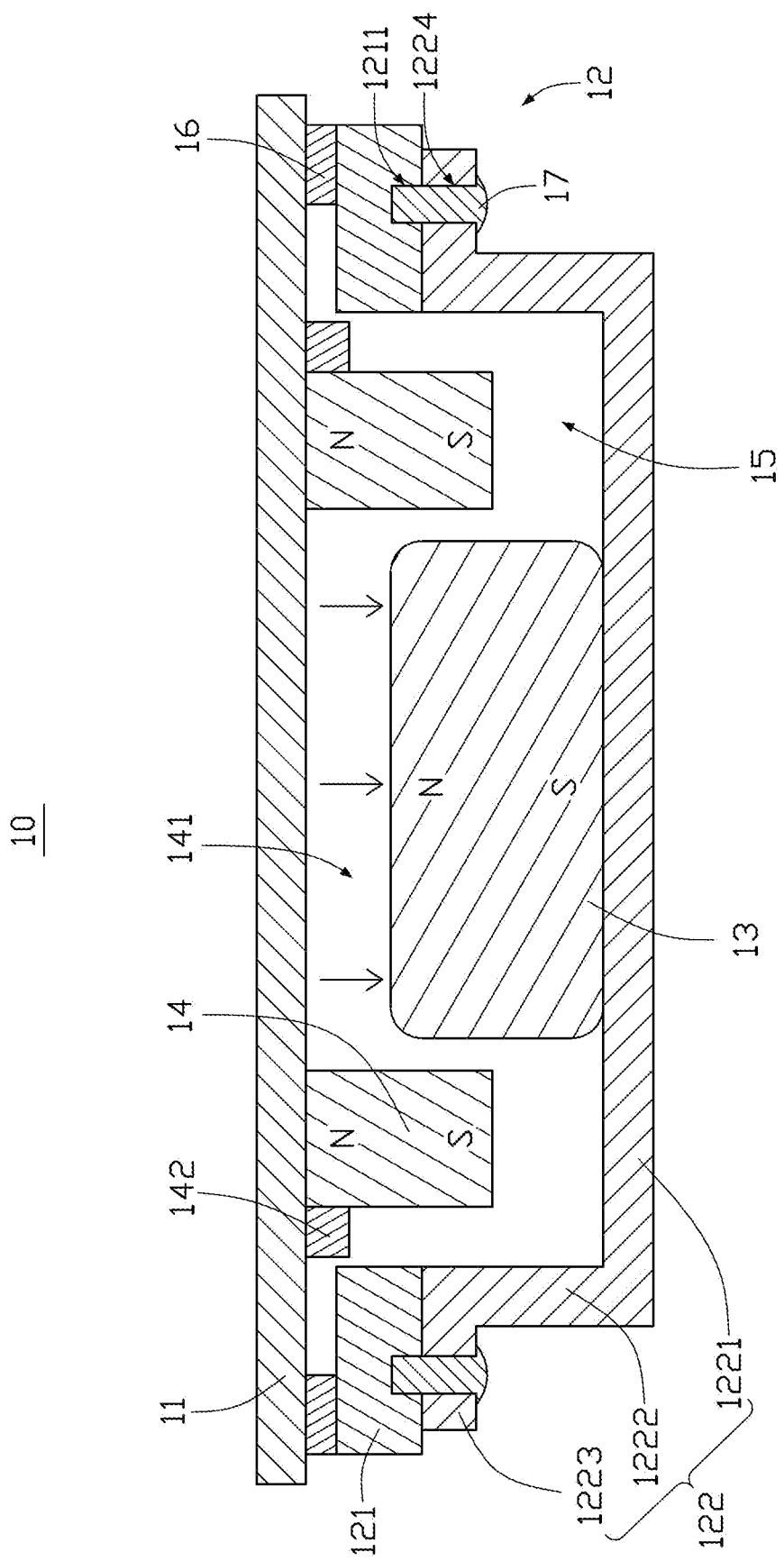
FIG. 6 is a schematic cross-sectional diagram of the display module shown in FIG. 2.

In other embodiments, the fixing portion 142 may extend from the upper edge 143 away from the central axis of the coil 14, so that the coil 14 is arranged on the display screen 11 through the fixing portion 142 (shown in FIG. 6).

In another embodiment, the fixing portion 142 includes a plurality of fixing sub-portions 1421. The plurality of fixing sub-portions 1421 is arranged on the upper edge 143 or the lower edge 144 at intervals. Each of the fixing sub-portions 1421 extends from the upper edge 143 or the lower edge 144 away from the central axis of the coil 14. A number of the fixing sub-portions 1421 is not limited, and may be two, three, four, or more. Referring to FIG. 5, in one embodiment, the fixing portion 142 includes two fixing sub-portions 1421. Each fixing sub-portion 1421 extends from the lower edge 144 away from the central axis of the coil 14. The two fixing sub-portions 1421 are respectively located on opposite sides of the coil 14.

The display module 10 will be specifically described below through specific embodiments.

Referring to FIG. 2, in a first embodiment, the display module 10 includes a display screen 11, a middle frame 12, a magnet 13, and a coil 14. The display screen 11 is arranged on the middle frame 12 and cooperatively defines a receiving space 15 with the middle frame 12. The magnet 13 and the coil 14 are received in the receiving space 15.

In the first embodiment, the middle frame 12 includes a first housing 121 and a second housing 122. The first housing 121 has an annular shape. The first housing 121 is arranged between the display screen 11 and the second housing 122 to couple the display screen 11 and the second housing 122 together. The second housing 122 includes a bottom wall 1221, a side wall 1222 surrounding a periphery of the bottom wall 1221, and a connecting portion 1223. The connecting portion 1223 extends outward from one end of the side wall 1222 away from the bottom wall 1221. The first housing 121 is arranged on the connecting portion 1223. The second housing 122 is an integrally formed structure.

A connecting member 16 is provided between the first housing 121 and the display screen 11. The connecting member 16 couples the display screen 11 and the first housing 121 together. In the first embodiment, the connecting member 16 is a double-sided foam tape, so that the connecting member 16 not only serves to couple the first housing 121 and the display screen 11 together, but also provides a buffer for the display screen 11.

Figure 13:
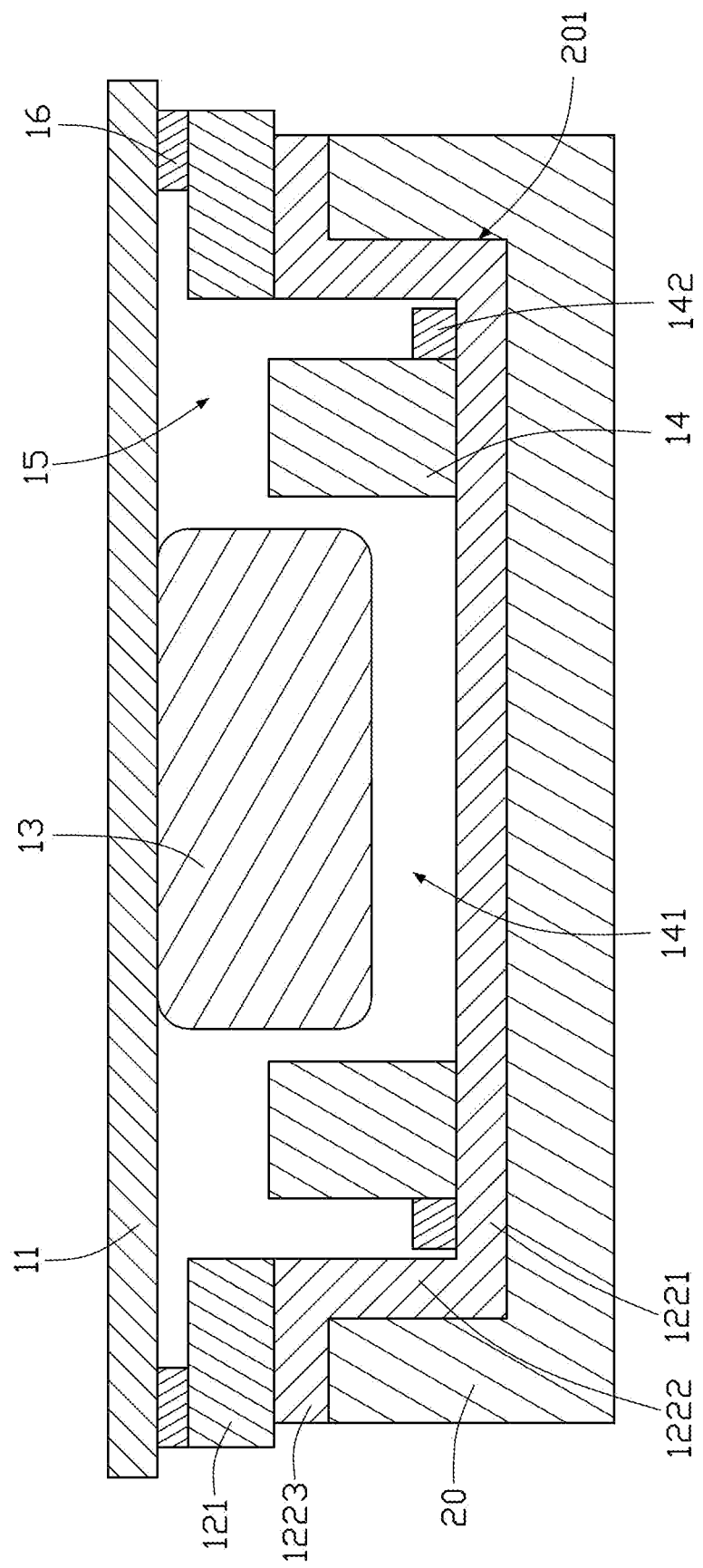
FIG. 13 is a schematic cross-sectional diagram of an electronic device according to an embodiment of the application.

The middle frame 12 further includes a mounting member 17. In the first embodiment, the mounting member 17 is a screw. The second housing 122 is fixed to the first housing 121 through the mounting member 17. Specifically, the connecting portion 1223 of the second housing 122 is provided with a first mounting hole 1224, and the first housing 121 is provided with a second mounting hole 1211 corresponding to the first mounting hole 1224. The mounting member 17 is arranged in the first mounting hole 1224 and the second mounting hole 1211 to fix the second housing 122 onto the first housing 121. Referring to FIG. 13, in other embodiments, the first housing 121 and the second housing 122 may be coupled together by a surface mount process, so that the mounting member 17, the first mounting hole 1224, and the second mounting hole 1211 are omitted.

In the first embodiment, the coil 14 is arranged on the display screen 11. The coil 14 is an annular structure formed by winding a wire in one direction, so that the coil 14 defines an accommodation space 141. In the first embodiment, a current signal passing through the coil 14 is an alternating current (AC) signal, so that a polarity of two ends of the coil 14 will alternate between a north (N) pole and a south (S) pole. That is, under the action of the AC signal, the N pole of the coil 14 changes from facing the display screen 11 to facing the middle frame 12, and the S pole of the coil 14 changes from facing the middle frame 12 to facing the display screen 11, or the N pole of the coil 14 changes from facing the middle frame 12 to facing the display screen 11, and the S pole of the coil 14 changes from facing the display screen 11 to the middle frame 12.

In the first embodiment, a cross-sectional shape of the coil 14 is a circular ring. The coil 14 includes an upper edge 143 and a lower edge 144 facing away from the upper edge 143. The upper edge 143 faces the display screen 11. Referring to FIG. 6, the upper edge 143 includes a fixed portion 142 extending away from the central axis of the coil 14. The coil 14 is arranged on the display screen 11 through the fixing portion 142.

The magnet 13 is arranged on the bottom wall 1221 of the second housing 122, and a portion of the magnet 13 is accommodated in the accommodation space 141. In the first embodiment, the N pole of the magnet 13 faces the display screen 11, and the S pole of the magnet 13 faces the bottom wall 1221, so that the AC signal of the coil 14 causes the polarity of the two ends of the coil 14 to alternate between the N pole and the S pole. In this way, based on the principle of magnetic attraction and repulsion, the coil 14 and the magnet 13 will attract or repel each other, thereby driving the display screen 11 to vibrate toward or away from the second housing 122 to generate sound.

Figure 7:
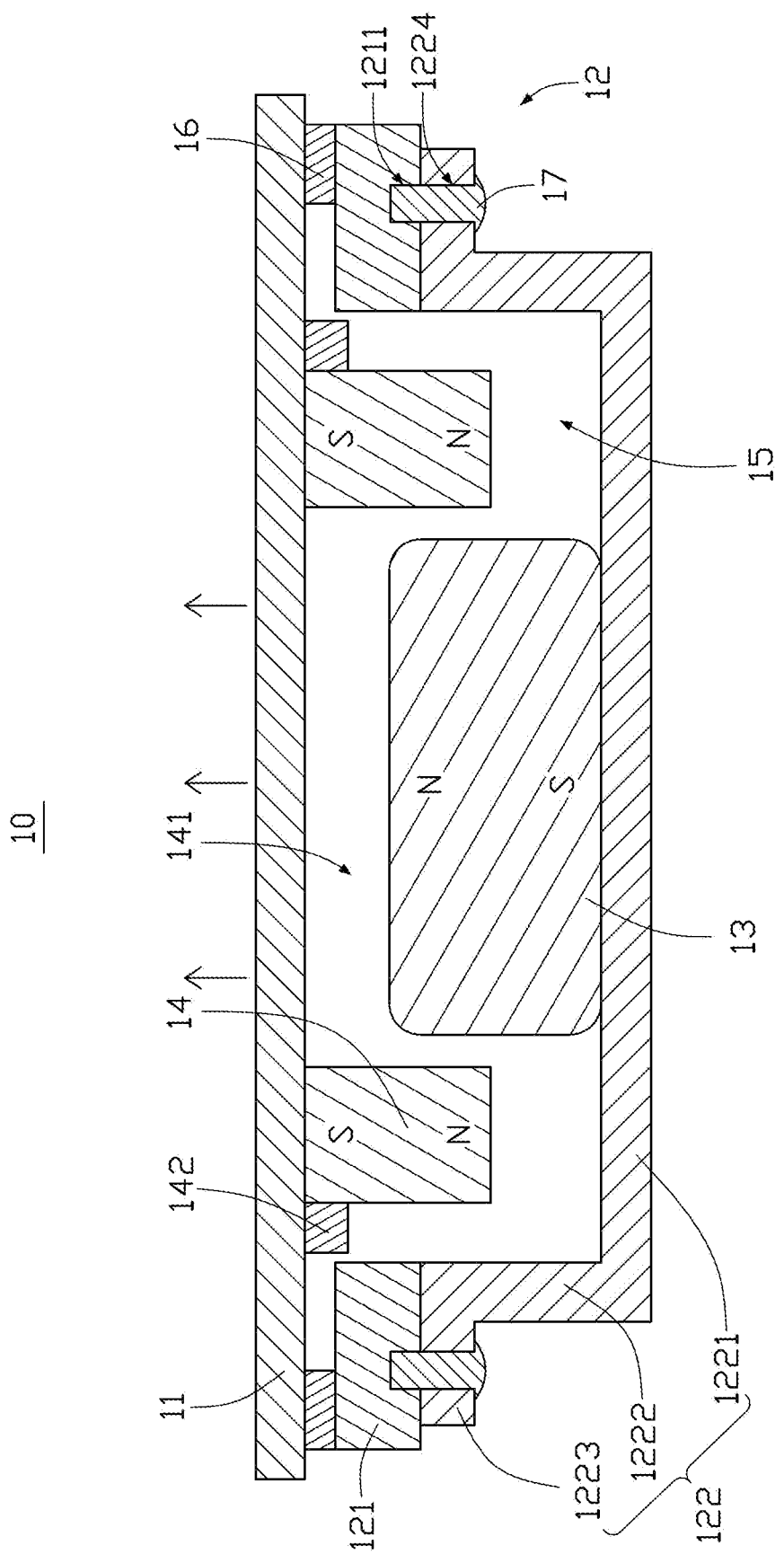
FIG. 7 is a schematic cross-sectional diagram of the display module shown in FIG. 2.

Specifically, referring to FIG. 6, under the action of an AC signal, the N pole of the coil 14 faces the display screen 11, and the S pole of the coil 14 faces the bottom wall 1221. At this time, since a portion of the magnet 13 is accommodated in the accommodation space 141, the S pole of the coil 14 is adjacent to the N pole of the magnet 13, and the coil 14 and the magnet 13 are attracted to each other, thereby driving the display screen 11 to vibrate toward the second housing 122. Referring to FIG. 7, under the action of the AC signal, the N pole of the coil 14 is changed from facing the display screen 11 to facing the bottom wall 1221, and the S pole is changed from facing the bottom wall 1221 to facing the display screen 11, so that the N pole of the coil 14 is adjacent to the N pole of the magnet 13. Therefore, the coil 14 and the magnet 13 repel each other, thereby driving the display screen 11 to vibrate in a direction away from the second housing 122. Under the action of the AC signal of the coil 14, the repeated mutual attraction and repulsion between the magnet 13 and the coil 14 drive the display screen 11 to vibrate toward or away from the second housing 122 to produce sound.

In the first embodiment, a portion of the magnet 13 is accommodated in the accommodation space 141, which can reduce an occupied space of the magnet 13, and at the same time ensure interaction between the magnet 13 and the coil 14 to drive the display screen 11 to vibrate.

In other embodiments, the S pole of the magnet 13 faces the display screen 11 and the N pole faces away from the display screen 11.

Referring to FIG. 3, the difference between the second embodiment and the first embodiment lies in the structure of the coil 14 and the position where the magnet 13 and the coil 14 are arranged in the second embodiment.

Figure 8:
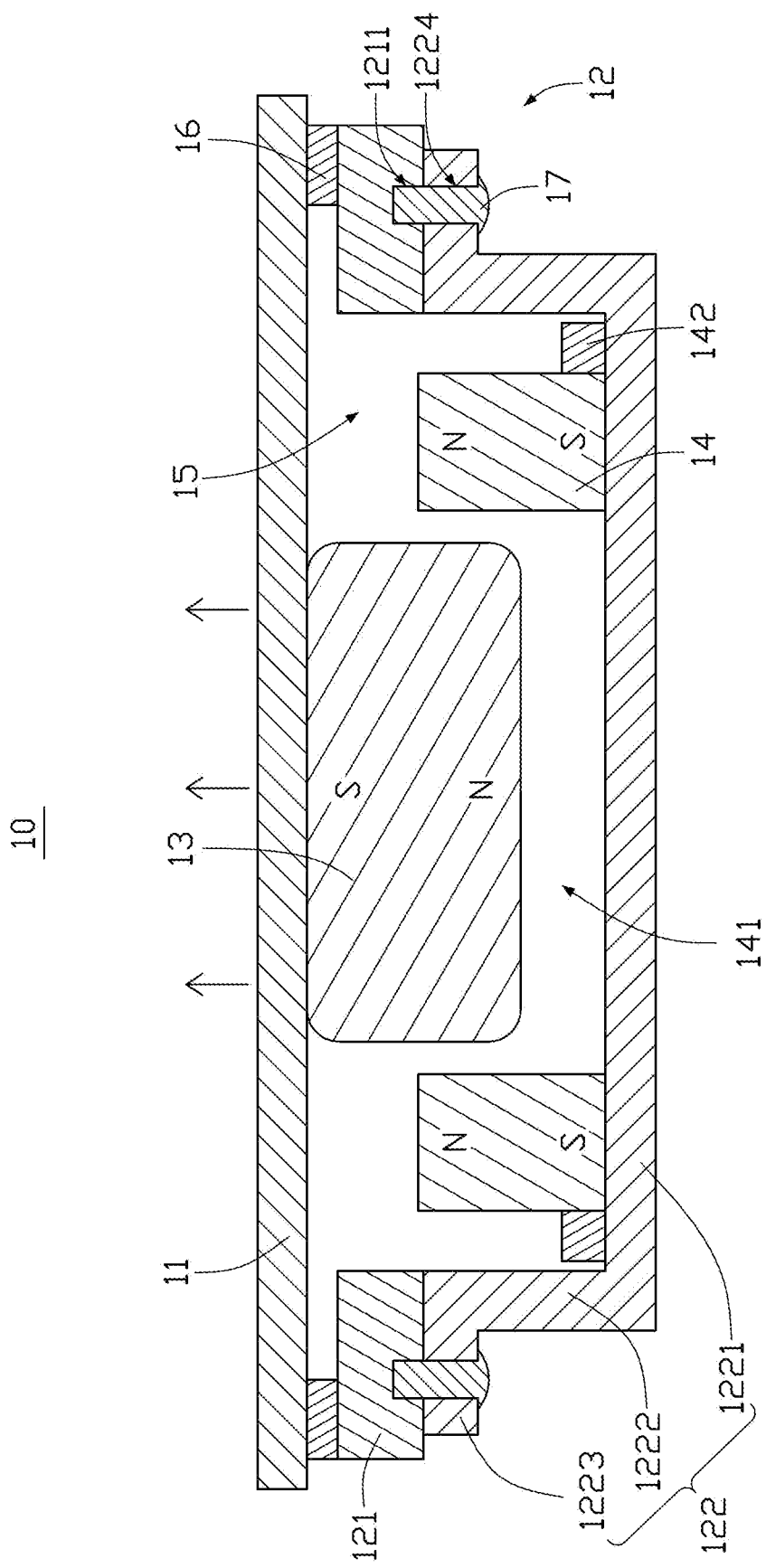
FIG. 8 is a schematic cross-sectional diagram of the display module shown in FIG. 3.

Referring to FIG. 8, in the second embodiment, the fixing portion 142 is arranged on the lower edge 144. Specifically, the fixing portion 142 extends outward from the lower edge 144 of the coil 14 away from the central axis of the coil 14. The coil 14 is arranged on the bottom wall 1221 of the second housing 122 through the fixing portion 142. The magnet 13 is arranged on the display screen 11, and a portion of the magnet 13 is accommodated in the accommodation space 141. In the second embodiment, the S pole of the magnet 13 faces the display screen 11 and the N pole of the magnet 13 faces the bottom wall 1221. As the AC current of the coil 14 causes the polarity of the two ends of the coil 14 to alternate between the N pole and the S pole, the coil 14 and the magnet 13 alternately attract and repel each other, thereby driving the display screen 11 to vibrate toward or away from the second housing 122 to generate sound.

Figure 9:
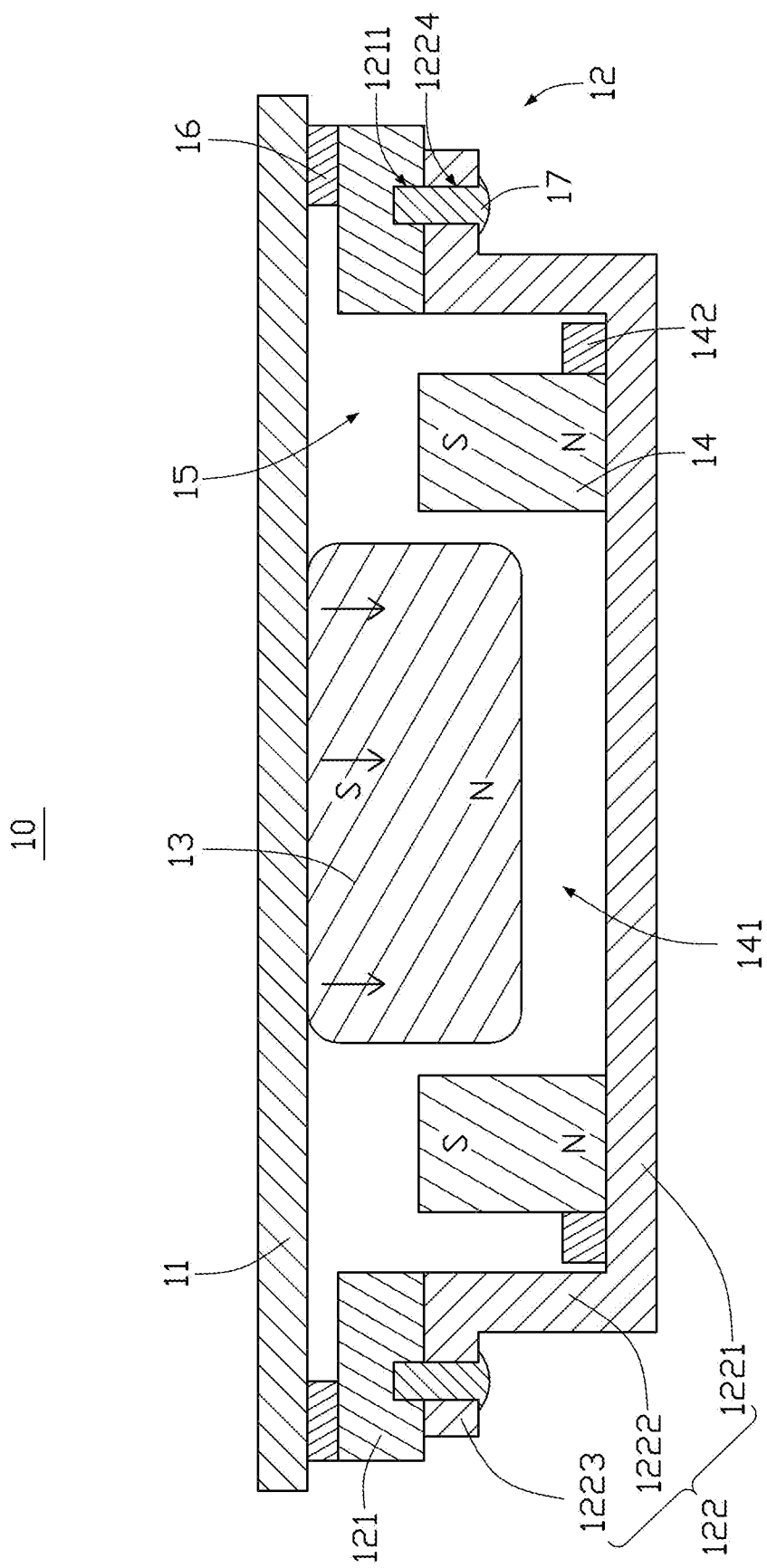
FIG. 9 is a schematic cross-sectional diagram of the display module shown in FIG. 3.

Specifically, referring to FIG. 8, under the action of an AC signal, the N pole of the coil 14 faces the display screen 11, and the S pole of the coil 14 faces the bottom wall 1221. At this time, because a portion of the magnet 13 is accommodated in the accommodation space 141, the N pole of the coil 14 is adjacent to the N pole of the magnet 13. Thus, the coil 14 and the magnet 13 mutually repel each other, thereby driving the display screen 11 to vibrate away from the second housing 122. Referring to FIG. 9, under the action of the AC signal, the N pole of the coil 14 changes from facing the display screen 11 to facing the bottom wall 1221, and the S pole of the coil 14 changes from facing the bottom wall 1221 to facing the display screen 11. At this time, since a portion of the magnet 13 is accommodated in the accommodation space 141, the S pole of the coil 14 is adjacent to the N pole of the magnet 13. Thus, the coil 14 and the magnet 13 are attracted to each other, thereby driving the display screen 11 to vibrate toward the second housing 122. As the AC current of the coil 14 causes the polarity of the two ends of the coil 14 to alternate between the N pole and the S pole, the coil 14 and the magnet 13 alternately attract and repel each other, thereby driving the display screen 11 to vibrate toward or away from the second housing 122 to generate sound.

Referring to FIG. 5, the difference between the third embodiment and the second embodiment lies in the structure of the coil 14 of the third embodiment.

In the third embodiment, a cross-sectional shape of the coil 14 is a rectangular ring. The fixing portion 142 includes two fixing sub-portions 1421 spaced apart. The fixing sub-portions 1421 extend from the lower edge 144 in the direction opposite to the central axis of the coil 14. The two fixing sub-portions 1421 are respectively located on both sides of the coil 14.

Figure 10:
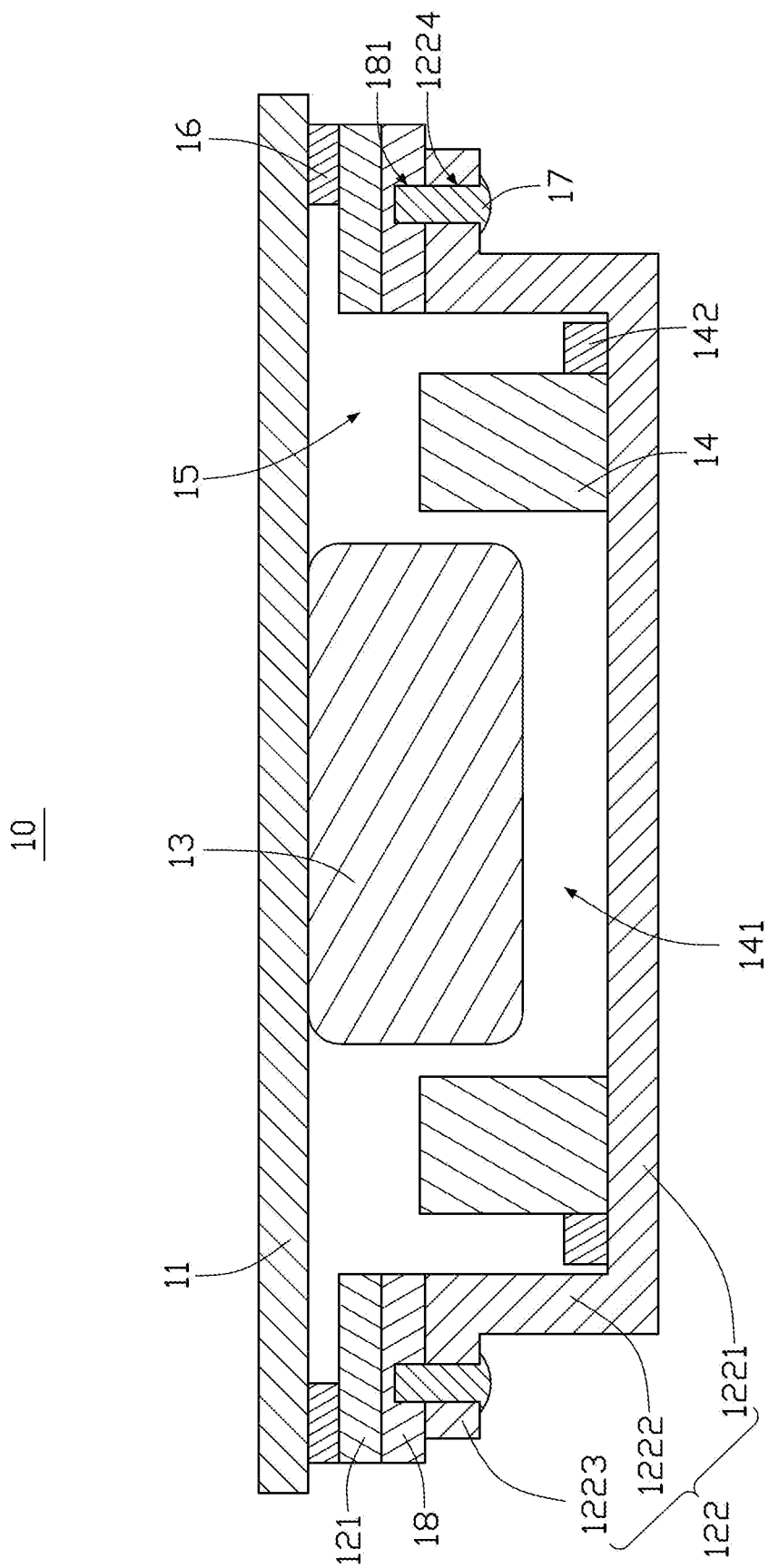
FIG. 10 is a schematic cross-sectional diagram of a display module according to another embodiment of the application.

Referring to FIG. 10, the difference between the fourth embodiment and the second embodiment is that the display module 10 in the fourth embodiment further includes a circuit board 18.

The circuit board 18 is arranged between the first housing 121 and the second housing 122. In the fourth embodiment, the second mounting hole 1211 is omitted from the first housing 121. The circuit board 18 is arranged on the first housing 121 through a surface mount process. The second housing 122 is arranged on the circuit board 18 through the mounting member 17. Specifically, the circuit board 18 is provided with a third mounting hole 181. The third mounting hole 181 is aligned with the first mounting hole 1224. In this way, the mounting member 17 is arranged in the first mounting hole 1224 and the third mounting hole 181 to fix the second housing 122 onto the circuit board 18.

Figure 11:
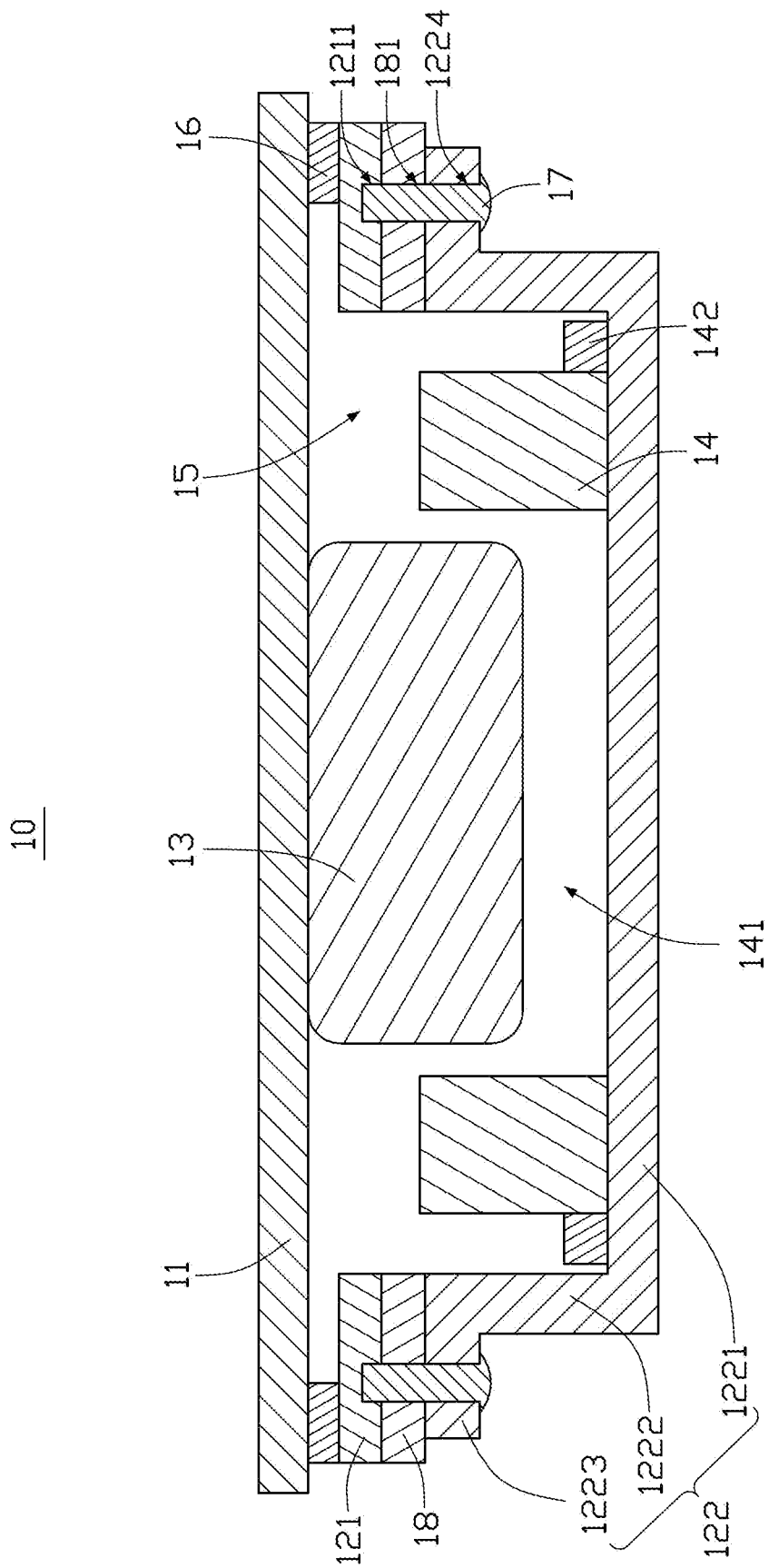
FIG. 11 is a schematic cross-sectional diagram of a display module according to another embodiment of the application.

Referring to FIG. 11, the difference between the fifth embodiment and the fourth embodiment lies in the connection manner of the circuit board 18 and the first housing 121 in the fourth embodiment.

In the fifth embodiment, the circuit board 18 and the second housing 122 are arranged on the first housing 121 through the mounting member 17. In detail, the first housing 121 is provided with the second mounting hole 1211, and the second mounting hole 1211 is aligned with the first mounting hole 1224 and the third mounting hole 181. In this way, the mounting member 17 is arranged in the first mounting hole 1224, the second mounting hole 1211, and the third mounting hole 181 to arrange the circuit board 18 and the second housing 122 onto the first housing 121.

Figure 12:
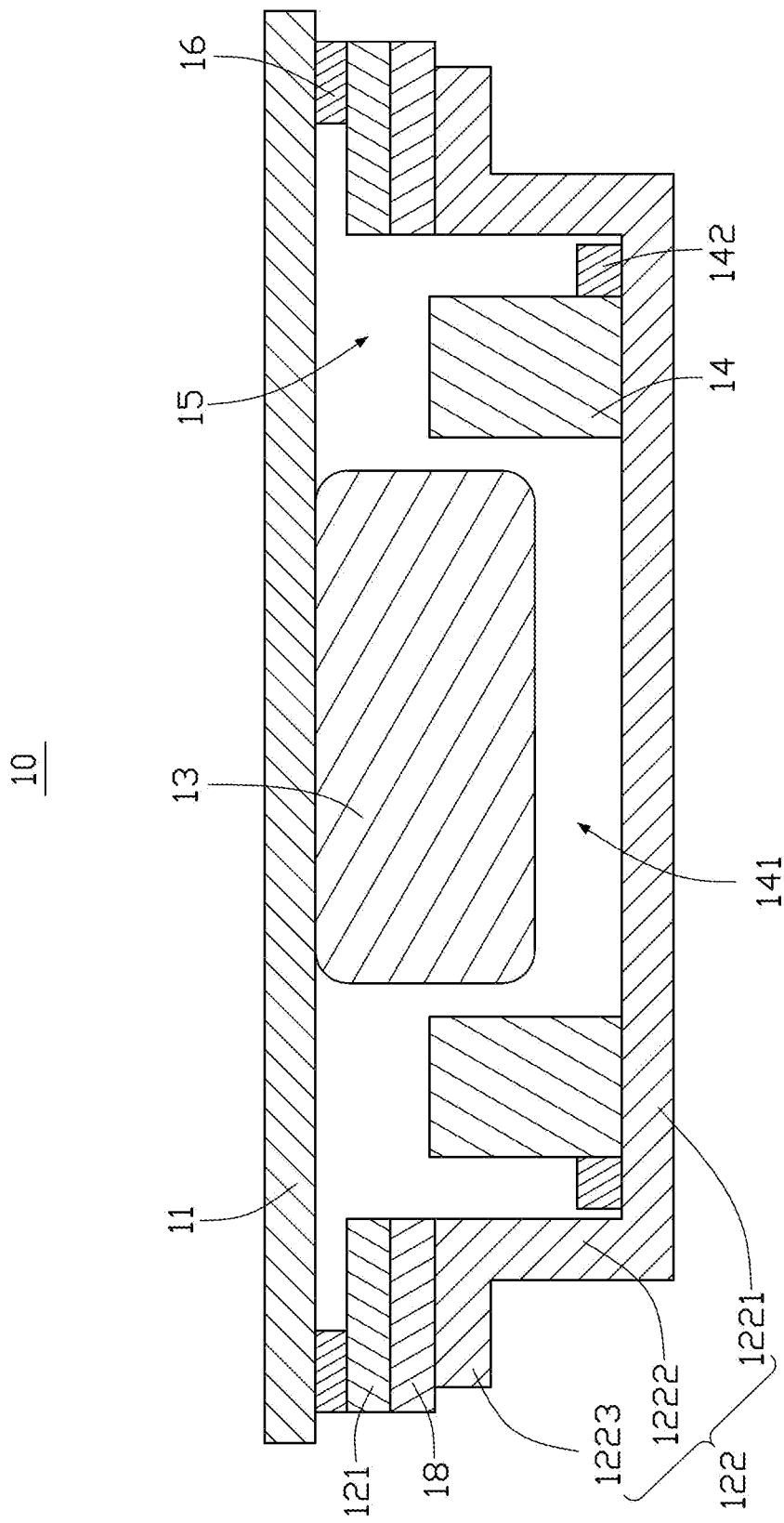
FIG. 12 is a schematic cross-sectional diagram of a display module according to another embodiment of the application.

Referring to FIG. 12, the difference between the sixth embodiment and the fourth embodiment lies in the connection manner of the circuit board 18 and the second housing 122 in the sixth embodiment 6.

In the sixth embodiment, the second housing 122 is arranged onto the circuit board 18 through a surface mount process, so that the first mounting hole 1224 of the second housing 122 and the third mounting hole 181 of the circuit board 18 are omitted.

Referring to FIG. 13, in one embodiment, the electronic device 100 further includes a battery 20. The battery 20 defines a groove 201 for receiving a portion of the second housing 122. In this way, an occupied space of the display module 10 is reduced to improve space utilization of the electronic device 100.

Figure 14:
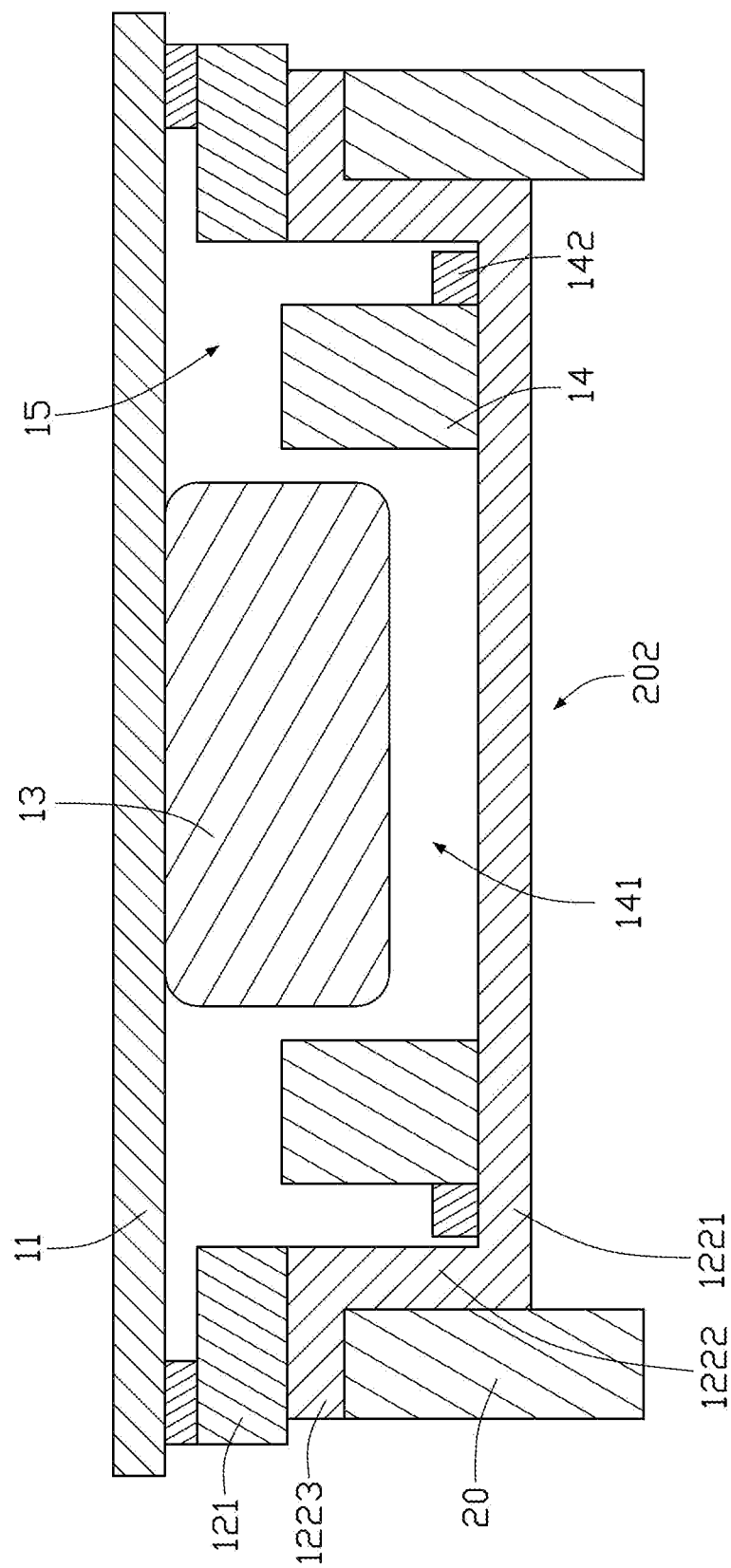
FIG. 14 is a schematic cross-sectional diagram of an electronic device according to another embodiment of the application.

Referring to FIG. 14, in other embodiments, the battery 20 is provided with a through hole 202. The through hole 202 penetrates the battery 20, and the second housing 122 is received in the through hole 202.

In another embodiment, the second housing 122 can be further embedded in a gap between two electronic components in the electronic device 100.

In summary, one of the magnet 13 and the coil 14 is arranged on the display screen 11, and the other one of the magnet 13 and the coil 14 is arranged on the middle frame 12. A portion of the magnet 13 is accommodated in the accommodation space 141 of the coil 14. The AC current of the coil 14 causes the polarity of the coil 14 to alternately change to cause the coil 14 and the magnet 13 to alternately attract and repel each other, thereby driving the display screen 11 to alternately move toward and away from the second housing 122, so that the display screen 11 vibrates and produces sound. In addition, the magnet 13 partially accommodated in the accommodation space 141 can reduce an occupied space of the magnet 13, and at the same time ensure interaction between the magnet 13 and the coil 14 to drive the display screen 11 to vibrate.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising a display module, the display module comprising:
   a middle frame comprising a first housing and a second housing, the first housing being annular-shaped, the second housing comprising a bottom wall, a side wall surrounding a periphery of the bottom wall, and a connecting portion, the connecting member connected to the sidewall and the first housing;
   a display screen arranged on the middle frame, the first housing being arranged between the display screen and the second housing, the display screen and the middle frame cooperatively defining a receiving space;
   a coil defining an accommodation space; and
   a magnet, a portion of the magnet accommodated in the accommodation space; wherein:
   the magnet and the coil are received in the receiving space; and
   the magnet is arranged on the display screen, and the coil comprises an upper edge facing the display screen and a lower edge opposite the upper edge, the coil further comprises a fixing portion extending from the upper edge or the lower edge of an outer periphery of the coil away from a central axis of the coil, the coil is arranged on the bottom wall through the fixing portion;
   the electronic device further comprises a battery, wherein:
   the battery is disposed below the connecting member, a surface of the battery facing the connecting member is recessed to form a groove, and the bottom wall and the side wall of the second housing are received in the groove.

2. The electronic device of claim 1, wherein:
   a cross-sectional shape of the coil is a circular ring, an elliptical ring, or a rectangular ring.

3. The electronic device of claim 1, further comprising a battery, wherein:
   the battery is provided with a through hole penetrating the battery; and
   the middle frame is received in the through hole.

4. The electronic device of claim 1, further comprising a circuit board, wherein:
   the circuit board is arranged between the first housing and the second housing.

5. The electronic device of claim 4, wherein:
   the first housing and the circuit board are coupled together by a surface mount process or a screw connection; and
   the second housing is coupled to the circuit board by a surface mount process or a screw connection.

* * * * *